United States Patent
Brand et al.

(10) Patent No.: US 7,319,875 B2
(45) Date of Patent: Jan. 15, 2008

(54) METHOD FOR INTERIOR-SPACE/EXTERIOR-SPACE DETECTION OF A RESPONSE TRANSMITTER WHICH COMMUNICATES IN WIRE-FREE FASHION WITH A BASE STATION, AND A COMMUNICATIONS SYSTEM

(75) Inventors: Christian Brand, Maxhütte-Haidhof (DE); Klaus Hofbeck, Nuemarkt (DE)

(73) Assignee: Siemens Aktiengesellschaft, Munich (DE)

( * ) Notice: Subject to any disclaimer, the term of this patent is extended or adjusted under 35 U.S.C. 154(b) by 428 days.

(21) Appl. No.: 09/858,479

(22) Filed: May 17, 2001

(65) Prior Publication Data

US 2002/0022494 A1  Feb. 21, 2002

(30) Foreign Application Priority Data

May 19, 2000  (DE) .................. 100 24 852

(51) Int. Cl.
*H04Q 7/20* (2006.01)
(52) U.S. Cl. ............... 455/456.1; 455/410; 455/411
(58) Field of Classification Search ............. 455/517, 455/67.11, 558, 552.1, 67.7, 63.1, 11.1, 3.1, 455/209, 422.1, 429, 444, 410, 411, 569.2, 455/15, 16, 524, 63.2, 96, 404.2, 440, 562.1, 455/41.2, 575.7, 99, 456, 152.1, 151.2, 9; 307/9.1, 10.1–10.8; 370/908, 245, 338
See application file for complete search history.

(56) References Cited

U.S. PATENT DOCUMENTS 6,157,810 A * 12/2000 Georges et al. ............ 455/11.1
6,337,661 B1 * 1/2002 Kondoh et al. .......... 343/700 MS
2003/0122727 A1 * 7/2003 Koshizaka et al. ......... 343/872

FOREIGN PATENT DOCUMENTS

| DE | 42 40 426 C2 |   | 6/1994 |
| DE | 198 27 586 A1 |  | 6/1998 |
| EP | 0 153 613 | * | 4/1989 |
| EP | 0 153 613 B1 |  | 4/1989 |

* cited by examiner

*Primary Examiner*—Tu X. Nguyen
(74) *Attorney, Agent, or Firm*—Laurence A. Greenberg; Werner H. Stemer; Ralph E. Locher

(57) ABSTRACT

A communications system contains a base station (8) with a transmitter/receiver unit (10) for communication signals and a transmitter unit (14) for location interrogation signals; a response transmitter (20) with a transmitter/receiver unit (22) for the communication signals, and a receiver unit (26) for location interrogation signals. An interior space (2) which is located within the operating range of the communications system has walls (4) which are impermeable to one frequency range. The communication signals are transmitted and received in a frequency range to which the walls 4 are permeable. The location interrogation signals are transmitted in the frequency range to which the walls are impermeable.

2 Claims, 3 Drawing Sheets

METHOD FOR INTERIOR-SPACE/EXTERIOR-SPACE DETECTION OF A RESPONSE TRANSMITTER WHICH COMMUNICATES IN WIRE-FREE FASHION WITH A BASE STATION, AND A COMMUNICATIONS SYSTEM

CLAIM FOR PRIORITY

This application claims priority to German Application No. 10024 852.7 which was filed in the German language on May 19, 2000.

TECHNICAL FIELD OF THE INVENTION

Background of the Invention

The invention relates to a method for interior/exterior-space detection of a response transmitter which, and in particular, to a method which communicates in a wireless manner with a base station and a communication system.

Communications systems having a base station including a transmitter/receiver unit, and a response transmitter which, with a signal containing an item of code information, transmits a response signal in response to an interrogation signal, which response signal is received by the base station and evaluated with respect to the code information in order to identify the response transmitter, are well known.

EP 0 153 613 B1 discloses a response transmitter that contains a strip of magnetostrictive, ferromagnetic material which resonates mechanically at a preselected frequency within a frequency band. This response-transmitter specific resonance is detected by the base station as code information, such that when the code information corresponds to a previously stored code information item, an access system, for example, is enabled. This type of communications system is advantageous because carrying the response transmitter is sufficient to provide proof of the person's access authorization. In the keyless access system disclosed in EP 0 153 613 B1 and which is used, for example, in a motor vehicle, interrogation zones are defined by connecting transmitter/receiver antennas to the base station, the antennas being arranged at predetermined points on the vehicle. For example, it may be arranged in the vicinity of the driver's door and front seat passenger's door and used to emit short-range interrogation signals, to whose reception the response transmitter responds. It is also possible to arrange such an antenna within the trunk so that it is detected if the response transmitter has been left in the trunk. Given a positive detection by the trunk, for example, it is automatically prevented from being locked. The known keyless access system includes additional proximity sensors so that it is activated to emit an interrogation signal only if a person approaches a proximity sensor, for example.

Another advantage of such a communications system includes detecting whether the response transmitter is located inside or outside a space, in which case the communication between base station and response transmitter will be maintained irrespective of the location of the response transmitter, provided that the response transmitter is located in the transmitter range of the base station. In this way, it is possible to carry out enabling measures or control measures which depend on the location of the response transmitter or of a person carrying the response transmitter, for example, special authorizations for carrying out safety-relevant functions, as soon as it is ensured that the response transmitter is located in an interior space.

SUMMARY OF THE INVENTION

In one embodiment of the invention, there is a method for detection of a response transmitter which communicates with a base station. The method includes, for example, communicating using two frequency ranges between the base station and the response transmitter, the space being permeable to a first frequency range and impermeable to a second frequency range.

In one aspect of the invention, the communication from the response transmitter to the base station occurring in the first frequency range.

In another aspect of the invention, the base station transmitting a communication signal in the first frequency range and a location interrogation signal in the second frequency range. In still another aspect of the invention, the base station transmitting location interrogation signals selectively from one of inside and outside the space.

In yet another aspect of the invention, the response transmitter being activated using the location interrogation signal.

In another embodiment of the invention, there is a communications system. The system includes, for example, a base station with a first transmitter/receiver unit for communication signals and a transmitter unit for location interrogation signals, a response transmitter with a second transmitter/receiver unit for the communication signals and a receiver unit for location interrogation signals; and an interior space having walls impermeable to one frequency range, the communication signals being transmitted and received in a frequency range to which the walls are permeable and the location interrogation signals being transmitted in a frequency range to which the walls are impermeable.

In one aspect of the invention, the base station having a transmitter antenna located outside of the interior space and a transmitter antenna located inside of the interior space. In another aspect of the invention, the response transmitter including code data which is transmitted collectively in response to the communications interrogation signal.

In still another aspect of the invention, the communications system being a component of an anti-theft system of a motor vehicle, the base station being in a motor vehicle and the response transmitter being carried by a person.

In yet another aspect of the invention, the response transmitter being activated using the location interrogation signal.

In another aspect of the invention, the response transmitter including code data which is transmitted collectively in response to the communications interrogation signal.

BRIEF DESCRIPTION OF THE DRAWINGS

The invention is explained in more detail below by way of example and with reference to schematic drawings, in which.

DETAILED DESCRIPTION OF THE PREFERRED EMBODIMENTS

The invention discloses implementing, in a communications system with at least one base station and at least one response transmitter, detecting whether a response transmitter is located inside or outside a space.

An interior space is, for example, a space which is enclosed by electrical conductors. Such a space can be a space within a building, for example a space which is critical for safety, or the interior of a motor vehicle, etc. Depending on the construction of the electrical conductors, electromagnetic waves above a predetermined frequency are allowed to pass through, without attenuation, through the walls into the interior space. On the other hand, at large wavelengths or very low frequencies, the incoming waves or fields are not let through the walls owing to the influence of the electrical conductors. Communication between the base station and the response transmitter in a frequency range which is let through by the walls can thus be carried out irrespective of whether the base station and the response transmitter are located inside or outside the interior space. On the other hand, communication in a frequency range to which the walls are impermeable can take place only if the base station and the response transmitter are located on the same side of the walls of the interior space. By making expedient use of both frequency ranges for the communication it is thus possible for the response transmitter and the base station to communicate with one another continuously, but it is still possible to determine whether they are located on different sides of the walls of an interior space.

In one embodiment, the communications system is suitable in particular for use within anti-theft system or access control-system of a motor vehicle.

Figure 1:
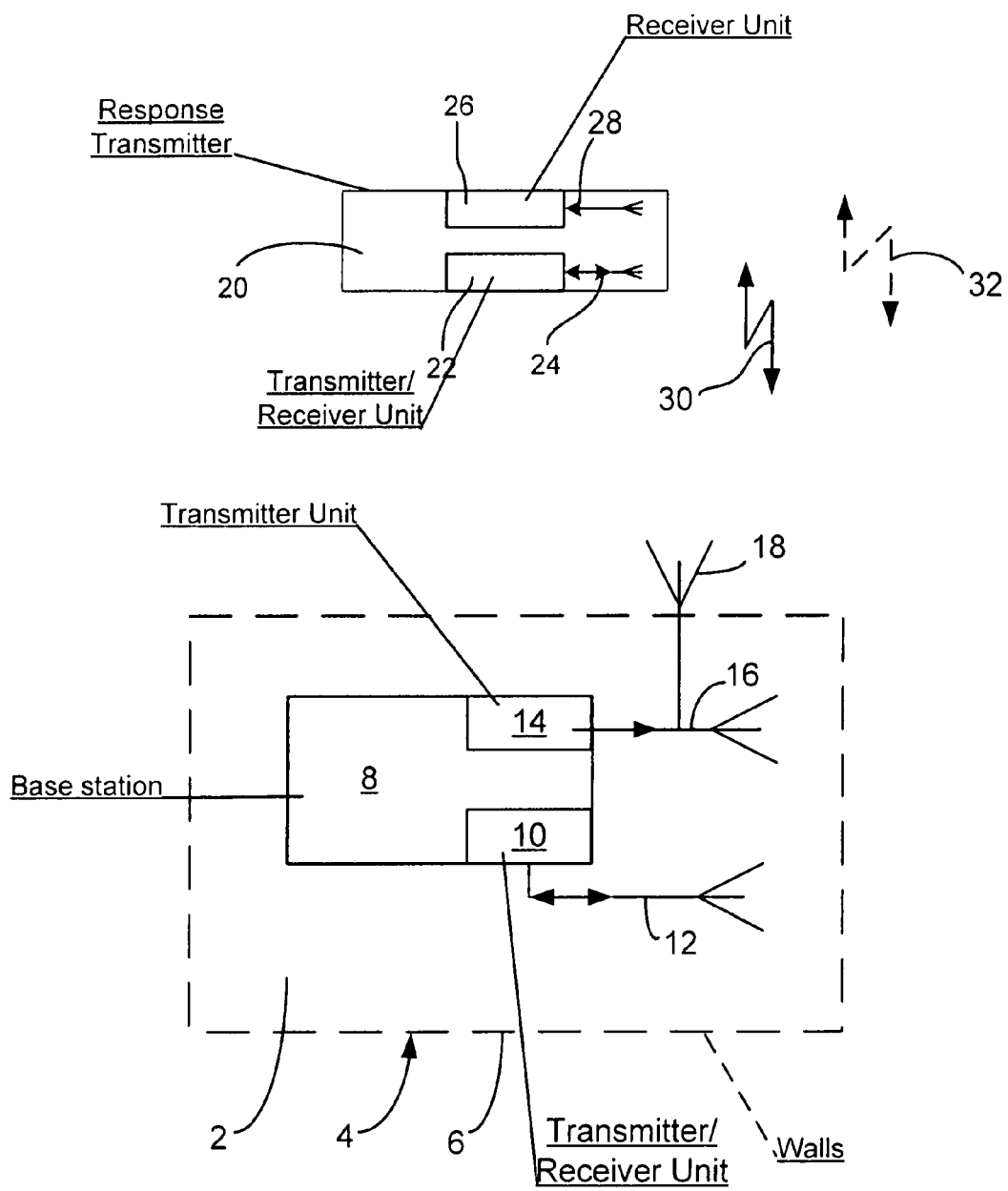
FIG. 1 shows a block circuit diagram of a communications system according to the invention.

According to FIG. 1, an interior space 2 is surrounded by walls 4 (which are indicated by dashed lines and which include electrical conductors 6), for example in the form of a lattice or in the form of flat components, as in the example of a motor vehicle.

In the example illustrated, a base station 8 is equipped, inside the interior space 2, with a transmitter/receiver unit 22 with a transmitter/receiver antenna 12 via which communication signals are transmitted and received. Furthermore, the base station 8 has a transmitter unit 14 for local interrogation signals, which transmitter unit 14 is connected to a transmitter antenna 16 located in the interior space 2, and a transmitter antenna 18 located in the exterior space.

The base station 8 includes further units (not illustrated) for generating the transmitted signals and for evaluating the received signals, as well as a control unit, preferably provided with a microprocessor, for controlling the operation.

The design and function of the individual elements or modules of the base unit are known and therefore not explained.

Furthermore, the system includes a response transmitter 20 with a transmitter/receiver unit 22 for communication signals, which transmitter/receiver unit 22 has a transmitter/receiver antenna 24, and a receiver unit 26 with a receiver antenna 28 for local interrogation signals.

In a way similar to the base station 8, the response transmitter 20 includes assemblies for generating these transmission/reception signals, for storing code information, for evaluating the received signals and for controlling the entire operation, and the design of said assemblies is known and is therefore not explained. The basic design of the response transmitter 20 can be similar, with the exception of the additionally provided receiver unit 26, to that of the data carrier, known, or response transmitter of keyless access control systems of motor vehicles.

For the walls 4 of the interior space 2 there is a critical wavelength $\gamma_c$ which is dependent on the distance between the electrical conductors 6 and above which electromagnetic waves do not penetrate the walls owing to the shielding effect of the electrical conductors 6. For the wavelengths $\gamma_c$ which are used in communication signals, and for the wavelengths $\gamma_o$ which are used for local interrogation signals, the following applies: $\gamma_k < \gamma_c < \gamma_o$. Accordingly, the operating range of a local interrogation signal or local detection signal is restricted to the region outside or inside the interior space 2 depending on whether the transmissions occur outside or inside the interior space, while the operating range of the communication signals covers the exterior and the interior space. The power with which the communication signals are transmitted, and the sensitivity of the associated receiving devices, are advantageously selected in such a way that the operating range is greater than the external dimensions of the interior space 2 and smaller than the operating range of a local interrogation signal. In FIG. 1, a communication signal 30 is represented throughout as a bidirectional signal. A local interrogation signal 32 is represented as a unidirectional signal by dashed lines.

In an extreme case, the frequency of a local interrogation signal may be virtually zero, i.e. a static electrical field can be excited.

Figure 2A:
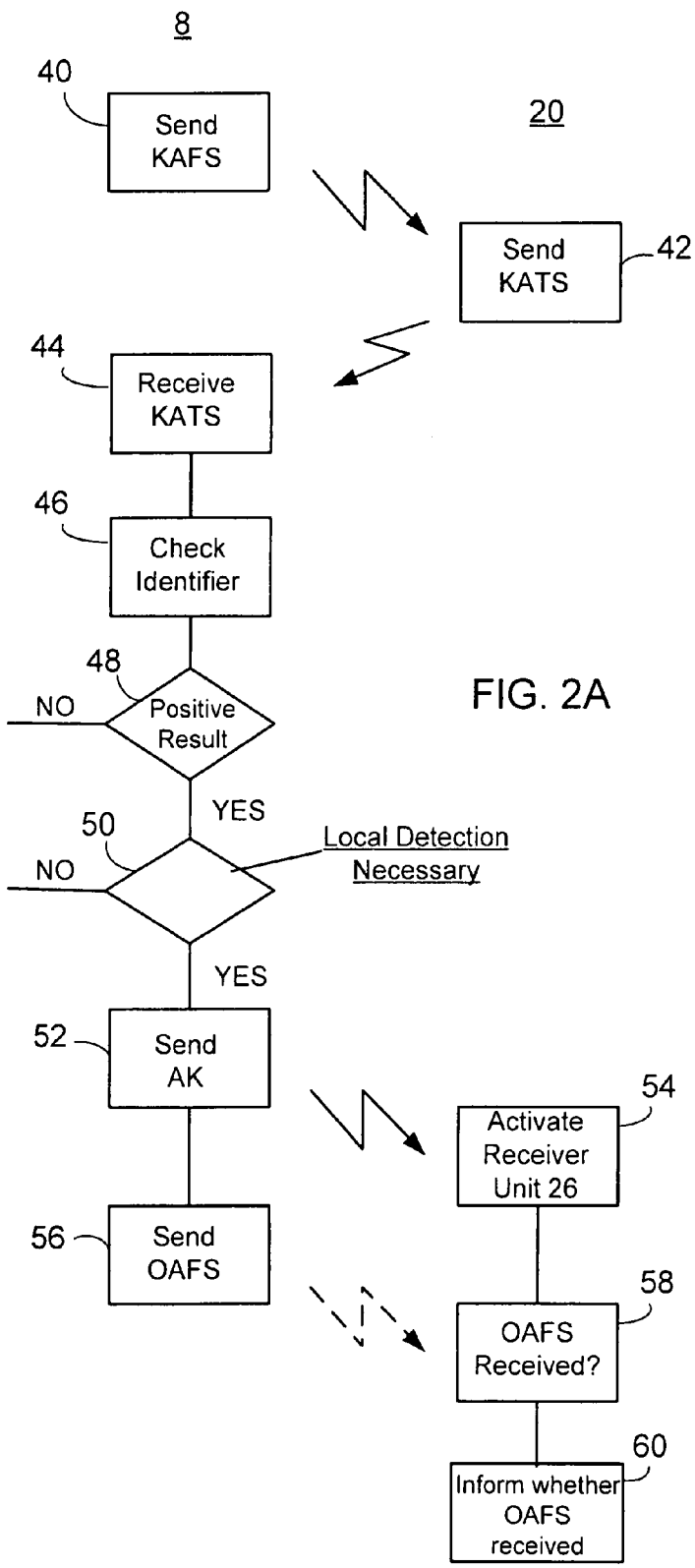
FIG. 2 shows a flowchart explaining the method of operation of the communications system.
Figure 2B:
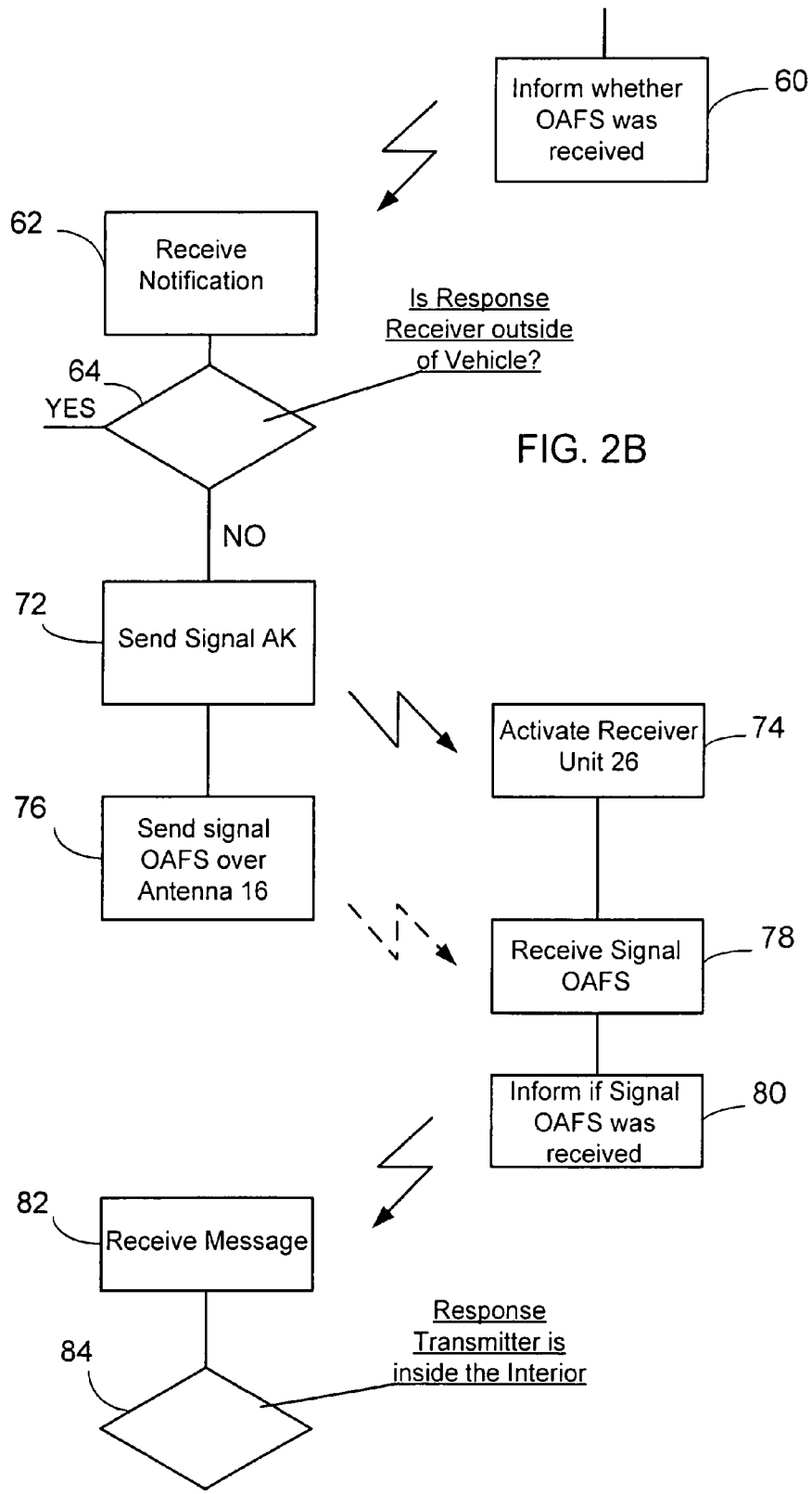

The method of operation of the system described will be explained below with reference to an example of an interrogation strategy according to FIG. 2.

It will be assumed that the base station 2 outputs a communications interrogation signal KAFS periodically or controlled as a function of events, in this example. If one of a plurality of possible response transmitters is located in the operating range of the base station 2 or inside its transmitting range, this response transmitter responds in step 42 with a communications response signal KATS which includes its identifier. This response signal KATS is received by the base station 8 in step 44 and the identifier is checked in 46. Given a check with a positive result (48), the system knows that there is an authorized response transmitter located in its area.

In order to initiate a specific action, the system must know whether the response transmitter, or a response transmitter, is located inside or outside the interior space 2. For example, the vehicle is allowed to be locked if a response transmitter is located outside the interior space, or the motor is allowed to be started if a response transmitter is located inside the interior space etc. It will be assumed in the present example that in 50 it is determined that a local detection is necessary because it has to be detected, for example for a locking operation, whether a response transmitter is located outside the interior space or the vehicle. The base station 2 then transmits, in 52, a communication signal AK with the content that a location interrogation signal is transmitted at a time $t_1$. The response transmitter activates, in 54 at the time $t_1$, its receiver unit 26 for the reception of the local interrogation signal. At the time $t_1$, the base station 8 transmits the local interrogation signal OAFS via the antenna 18 located outside the interior space 2. After the time $t_1$, the response transmitter 20 informs the base station 8, in a communications response signal in 60, whether or not it has received the local interrogation sianal in 58.

If the local interrogation signal OAFS has been received in 58, it is possible to conclude that the response transmitter 2 is located outside the interior space 2 and the vehicle can be locked (62 64).

If no local interrogation signal was received, it may be expedient to make additional positive checks as to whether the response transmitter is located in the interior of the vehicle in order to make sure that the non-reception of the local interrogation signal is not due to an error in the response transmitter. To do this, 72 to 84 which are similar to 52 to 64 are run, with the single difference that the local interrogation signal OAFS is transmitted by the antenna 16 located within the interior space 2 at a time $t_2$. This time is transmitted to the response transmitter 20, as described above, by a communication signal in 72. The response transmitter then switches its receiver unit 26 to the active state in 74 at the time $t^2$. The response transmitter 20 subsequently informs the base station 8, in 80, whether or not the response interrogation signal has been received.

If the response transmitter 20 has not received a local interrogation signal at the time t, and has received a local interrogation signal at the time t2, it is reliably determined that the response transmitter is located inside the interior 2 (84).

The time period between $t_1$ and $t_2$ is advantageously selected to be small in order to ensure that the position of the response transmitter has changed slightly during the interrogations.

The system described above and the interrogation strategy can be modified in diverse ways.

The determination of the location advantageously takes place in such a way that the space is interrogated first, and the local interrogation signal is transmitted via that antenna which is assigned to that space in which the signal transmitter must be located for an action to be enabled.

Alternatively, the local interrogation signal can be generated by the response transmitter and evaluated in the base station which then has two reception antennas.

The base station and/or the response transmitter may be designed in such a way that in each case the reception of a local interrogation signal which is transmitted in the frequency range to which the walls are impermeable automatically triggers a response signal which is transmitted in the other frequency range. In this way, that part of the bidirectional communication which otherwise takes place exclusively in the frequency range to which the wall 4 is permeable and triggers an activity of a part (data carrier or base station) which receives a local interrogation signal, takes place by the local interrogation signal which is used unidirectionally.

In order to shorten the reaction time, the communication signals and the local interrogation signal can be generated simultaneously because they can be identified unambiguously owing to their different frequencies. Furthermore, the communication signals within a communications frequency channel can be transmitted with a specific bandwidth. The same applies to the local interrogation signals.

If local interrogation signals with different features are used inside the interior space and outside the interior space, identical times can be selected for the times $t_1$ and $t_2$.

The antennas and the transmitter/receiver units for the different frequency ranges can be combined, insofar as is technically appropriate and expedient, within the base unit and the response transmitter.

The fact that the bidirectional communication takes place at the higher frequency meets the need to operate with a high Baud rate on the communications channel on the other hand, by the lower frequency local interrogation signal it is possible to operate with a high field strength so that the local interrogation signal can be used, for example, to activate or wake up the signal transmitter for a communication. It is also advantageous here that with the low-frequency interrogation signal the entire interior space is reliably covered and interrogated when an interior space interrogation occurs of course, the interrogation strategy or the bidirectional communication maybe appropriately modified if the signal transmitter is only activated by a local interrogation signal.

What is claimed is:

1. A communications system, comprising:
   a base station with a first transmitter/receiver unit for communication signals and a transmitter unit for location interrogation signals;
   a response transmitter with a second transmitter/receiver unit for the communication signals and a receiver unit for location interrogation signals; and
   an interior space having walls impermeable to one frequency range, the communication signals being transmitted and received in a frequency range to which the walls are permeable, such that communication between the base station and response transmitter continues, and simultaneously the location interrogation signals being transmitted in a frequency range to which the walls are impermeable to determine whether the base station and response transmitter are on a same side of the walls, wherein
   the response transmitter includes code data which is transmitted collectively in response to the communications interrogation signal, and
   the communications system is a component of an anti-theft system of a motor vehicle, the base station being in a motor vehicle and the response transmitter being carried by a person.

2. The communications system as claimed in claim 1, the base station having a transmitter antenna located outside of the interior space and a transmitter antenna located inside of the interior space.

* * * * *